US008322259B2

(12) United States Patent
Buchanan et al.

(10) Patent No.: US 8,322,259 B2
(45) Date of Patent: Dec. 4, 2012

(54) SAFETY SYSTEM AND METHOD FOR CUTTINIG MACHINE

(76) Inventors: Jeff Buchanan, Placentia, CA (US); Mark Buchanan, Cerritos, CA (US)

( * ) Notice: Subject to any disclaimer, the term of this patent is extended or adjusted under 35 U.S.C. 154(b) by 0 days.

(21) Appl. No.: 13/416,515

(22) Filed: Mar. 9, 2012

(65) Prior Publication Data

US 2012/0167729 A1 Jul. 5, 2012

Related U.S. Application Data (63) Continuation of application No. 13/191,997, filed on Jul. 27, 2011.

(60) Provisional application No. 61/424,570, filed on Dec. 17, 2010.

(51) Int. Cl.
*B23Q 15/00* (2006.01)
*B26D 5/00* (2006.01)

(52) U.S. Cl. .................................. 83/13; 83/72; 83/62.1

(58) Field of Classification Search ................ 83/13, 72, 83/522.13, 58, 62.1, 581, 490, 477.2, 477.1, 83/DIG. 1, 397; 241/36, 37.5; 324/234, 324/300, 676; 340/562
See application file for complete search history.

(56) References Cited

U.S. PATENT DOCUMENTS

| | | | |
|---|---|---|---|
| 3,785,230 A | 1/1974 | Lokey | |
| 3,947,734 A | 3/1976 | Fyler | |
| 4,026,177 A | 5/1977 | Lokey | |
| 4,195,722 A | 4/1980 | Anderson et al. | |
| 4,479,571 A | 10/1984 | Eliot | |
| 4,621,300 A | 11/1986 | Summerer | |
| 4,914,721 A | 4/1990 | Glaeser et al. | |
| 5,510,685 A * | 4/1996 | Grasselli | ........................ 318/434 |
| 5,667,152 A * | 9/1997 | Mooring | ...................... 241/37.5 |
| 6,418,004 B1 | 7/2002 | Mather et al. | |
| 6,853,531 B2 | 2/2005 | Mather et al. | |
| 7,236,849 B2 | 6/2007 | Walsh | |
| 7,365,955 B2 | 4/2008 | Mather et al. | |
| 7,661,614 B2 | 2/2010 | Matlin | |
| 7,712,403 B2 | 5/2010 | Gass et al. | |
| 7,757,982 B2 | 7/2010 | Matlin | |
| 7,827,889 B2 | 11/2010 | Carrier | |
| 8,082,825 B2 * | 12/2011 | Butler | ............................... 83/58 |
| 8,122,798 B1 * | 2/2012 | Shafer et al. | .................. 83/62.1 |
| 2004/0119470 A1 * | 6/2004 | Yajima et al. | ................. 324/253 |
| 2008/0012560 A1 * | 1/2008 | Crowley et al. | ............... 324/300 |
| 2008/0266088 A1 * | 10/2008 | Oyamada | ....................... 340/561 |
| 2010/0037739 A1 * | 2/2010 | Anderson et al. | ................. 83/58 |
| 2010/0147124 A1 * | 6/2010 | Seidel et al. | ....................... 83/72 |

FOREIGN PATENT DOCUMENTS

GB 700751 6/1951

* cited by examiner

*Primary Examiner* — Ghassem Alie
(74) *Attorney, Agent, or Firm* — Knobbe, Martens, Olson & Bear, LLP (57) ABSTRACT

A safety system prevents cutting machine operators from being accidentally carried through the infeed chute into the machine's cutting mechanism. An operator wears a safety device on his wrist and/or ankle and a sensor array mounts on opposing sides of the cutting machine's infeed chute. The sensor array elements are wound in opposite directions and connect in series opposing. The magnetic field of the safety device induces a current in the sensor array as it moves in the proximity of the sensor array. The safety system generates a signal which is proportional to the sum of the induced currents. When the signal exceeds a threshold, the safety system shuts off power to the feed mechanism and/or the cutting blades of the cutting machine, preventing injury to the operator.

8 Claims, 8 Drawing Sheets

SAFETY SYSTEM AND METHOD FOR CUTTINIG MACHINE

This application is a continuation of U.S. patent application Ser. No. 13/191,997, filed Jul. 27, 2011, entitled SAFETY SYSTEM AND METHOD FOR CUTTING MACHINE, which claims the benefit of priority under 35 U.S.C. §119(e) of U.S. Provisional Patent Application No. 61/424,570, filed on Dec. 17, 2010 and entitled "Safety Device for Cutting Machine," the entirety of which is hereby incorporated herein by reference to be considered part of this specification.

BACKGROUND

This invention relates, generally, to automatically stopping the operation of machinery, and more particularly, to cutting machines, such as wood chippers having one or more feed wheels for controlling the infeed of bulk wood products, one or more cutting blades which create and direct the produced wood chips toward a discharge chute, and an emergency safety device with a sensor array located in the infeed chute that directs control circuitry to stop the motive power directed to the feed wheels, the cutting blade, or both Cutting machines such as wood chippers are used to reduce branches, trees, and other bulk wood products into small wood chips. A typical wood chipper often contains an infeed chute, a feed system for controlling the feed rate of wood products, a wood chipping mechanism, a drive system for the feed system and chipping mechanism, and a discharge chute. The infeed chute is typically a funnel-type conduit provided with a wide opening which tapers toward the feed system to converge the bulk wood products toward the chipping mechanism.

Through the action of the feed system, the bulk wood products are brought into contact with the chipping mechanism which grinds, flails, or cuts the wood products into small pieces and propels the small pieces into the discharge chute where they exit the wood chipper.

These types of wood chippers are, if operated incorrectly, dangerous devices. The chipping mechanism typically rotates at a high speed and produces high torques, which are necessary to chip the wood. The feed system located at the narrowest point of the infeed chute is a dangerous area which can catch a user's clothing or, more importantly, a user's limb if he improperly reaches into the infeed chute during operation of the chipper. If a user does get entangled in the feed system of known chippers, the user may not be able to reach a shutoff actuator located outside of the chute. Indeed, serious injuries continue to occur to operators of these devices.

SUMMARY

A wood chipper according to an embodiment of the invention incorporates a safety device to cut off power to a feed system, a cutting mechanism, or both. Certain embodiments can be used with a wide variety of waste reducing machinery which receives waste products through an infeed chute. Other embodiments can be used with a wide variety of machinery to automatically disable their operation.

According to one embodiment, a sensor array having first and second sensor elements is mounted within the infeed chute of the machinery. Each element of the sensor array detects the presence of a magnetic field which generates a current in each sensor element. For magnetic fields generated outside the sensor array, such as the magnetic field of the earth, the sensor array subtracts the currents generated in the first and second elements, thus canceling any effects thereof. For magnetic field generated inside the sensor array, such as a safety device comprising a magnet moving between the sensor array elements, the sensor array adds the currents generated in the first and second elements. This current or its corresponding voltage potential is amplified and compared to a threshold. When the current/voltage potential exceeds the threshold, control circuitry generates a shut-off signal, which disables operation of the machinery.

Furthermore, users of the machinery wear safety devices, such as gloves, wrist bands and/or ankle bracelets having magnets mounted therein. The magnets mounted in the safety devices produce the magnetic field detected by the sensor array. The sensor array detects the motion of the magnetic field between the sensor array elements, which are mounted on the infeed chute, and automatically notifies the control circuitry to stop the operation of the machine. For example, if a person wearing the glove type safety device moves his hand within the infeed chute of a wood chipping machine having sensor array elements mounted thereon, the sensor array will detect that the magnet mounted in the user's gloves is within the infeed chute. In response, the sensor array notifies the control circuitry to stop the operation of the feed system and/or the cutting mechanism.

Certain embodiments relate to a method of automatically interrupting the operation of a cutting machine including forming a sensor array including a first sensor element and a second sensor element. The first sensor element including a first winding wound in a first direction. The second sensor element including a second winding wound in a second direction. The first and second windings connected in series opposing. The method further comprising mounting the sensor array on opposing sides of an infeed chute of a cutting machine such that the first sensor element is mounted to a first side of the infeed chute and the second sensor element is mounted to an opposing second side of the infeed chute, and sensing a current induced in the windings by a magnetic field. The magnetic field produced by a safety device placed proximate to the sensor array. The method further comprises comparing a signal proportional to the induced current to a threshold, and terminating an operation of the cutting machine when the signal exceeds the threshold. The method further comprising inducing a first current in the first winding from the safety device positioned between the windings, inducing a second current in the second winding from the safety device positioned between the windings, adding the first and second induced currents, inducing a third current in the first winding from an external source, inducing a fourth current in the second winding from the external source, and subtracting the third current and the fourth current.

According to a number of embodiments, the disclosure relates to a safety system for a cutting machine. The safety system includes a sensor array including at least two sensor elements. Each sensor element comprises a protective plate and a winding. The winding comprises at least one loop of wire. The sensor elements mount on opposing sides of an infeed chute of a cutting machine and connect in series opposing. The safety system further comprises a signal processor, which comprises an amplifier to amplify a signal proportional to a current induced in the windings. The current induced by a magnetic field moving proximate to the sensor array. The signal processor further comprises a comparator to compare the amplified signal to a threshold value such that the signal processor causes the cutting machine to shut off power to an operation of the cutting machine when the amplified signal is greater than the threshold value.

In accordance with various embodiments, an apparatus for automatically interrupting operation of a cutting machine comprises a sensor array including at least a first array element and at least a second array element. Each array element includes a winding. The array elements connect in series opposing. The apparatus further comprises an amplifier for amplifying a signal proportional to a sum of a current induced by a magnetic field in the at least first sensor array element and a current induced by the magnetic field in the at least second sensor array element, a threshold circuit for generating a predetermined threshold, a comparator for comparing the amplified signal to the predetermined threshold, and a shut-off circuit to terminate an operation of a machine when the amplified signal is greater than the predetermined threshold.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

DETAILED DESCRIPTION

The features of the inventive systems and methods will now be described with reference to the drawings summarized above. Although certain embodiments are described with respect to safely operating a wood chipper, other embodiments can be used to stop the operation of machinery where an operator or operator's limb is within an unsafe distance from mechanisms that stamp, cut, roll, weld, shred, drill, bend, apply pressure, or the like. Yet other embodiments can be used to stop the operation of machinery when any foreign body is within an unsafe distance from the mechanisms.

Figure 1:
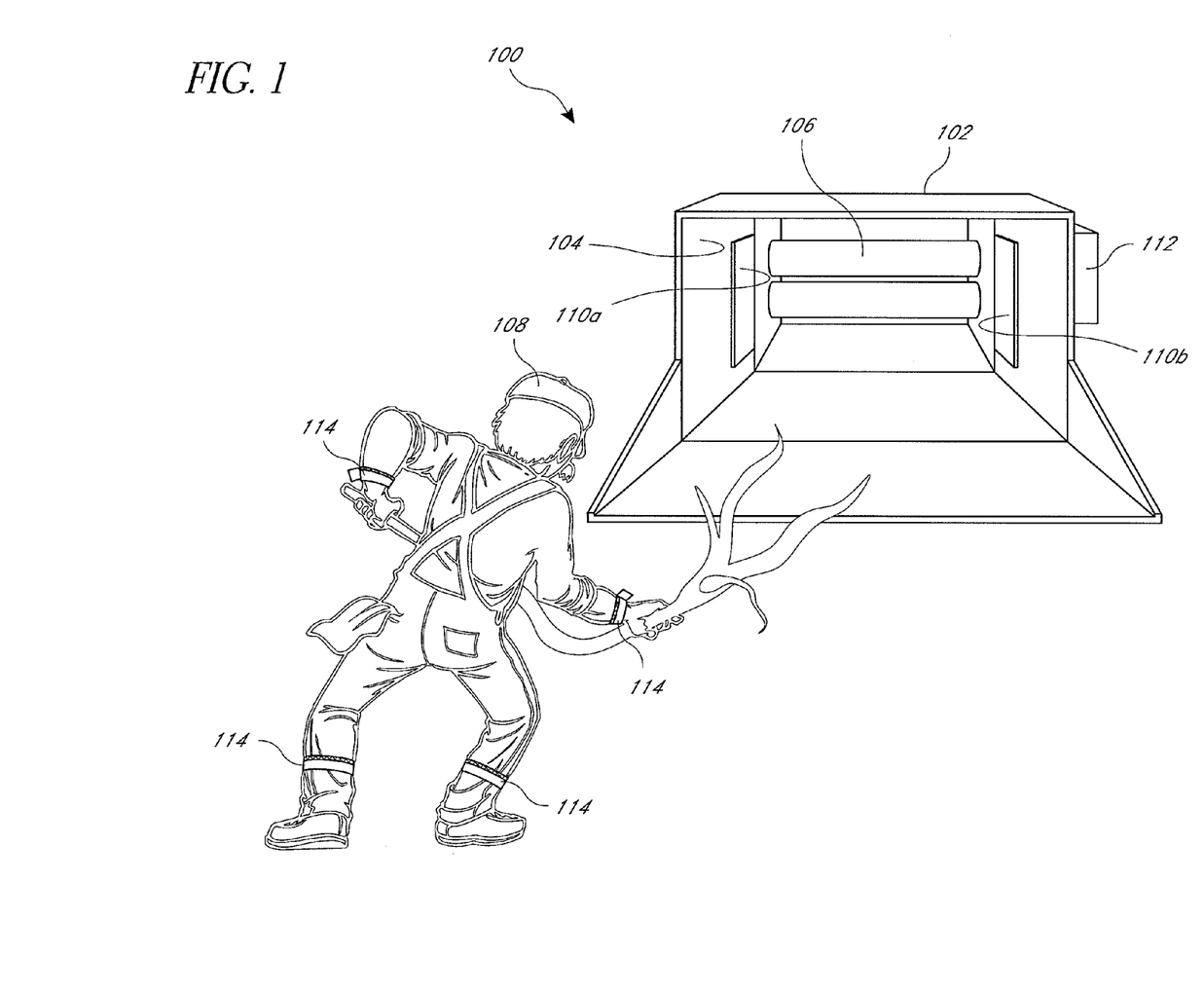
FIG. 1 illustrates a cutting machine safety system, according to certain embodiments.

FIG. 1 illustrates an embodiment of a cutting machine safety system 100. The system 100 comprises a cutting machine 102, such as a wood chipper or the like. The cutting machine 102 comprises an infeed chute 104, a feed mechanism 106 and cutting blades (not shown). An operator 108 typically feeds material to be shredded into the infeed chute 104, where it is captured by the feed mechanism 106. The feed mechanism 106 propels the material into the cutting blades located behind the feed mechanism 106, where the cutting blades macerate the materials. The feed rate of a wood chipper, for example, can be around 2 feet per second.

The system 100 further comprises a sensor array 110, control circuitry 112, and at least one safety device 114. In the illustrated embodiment, the sensor array 110 comprises a first sensor element 110a and a second sensor element 110b. In other embodiments, the sensor array 110 may have more than two sensor elements. In an embodiment, the sensor array 110 mounts onto the inside surface of the infeed chute 104, such that at least two sensor elements 110a, 110b oppose each other. In other embodiments, the sensor array elements mount onto any surface such that the sensor array detects the presence of the safety device 114 passing between at least two of the sensor array elements 110a, 110b.

The control circuitry 112 processes the signals from the sensor array 110 to determine whether the safety device 114, worn by the operator 108, has come between the sensor elements 110a, 110b. Once the control circuitry 112 detects the safety device 114 between the sensor array elements 110a, 110b, the control circuitry 112 generates a control signal to stop an operation of the machine 102, such as, for example, stopping the feed mechanism 106 from advancing, the cutting blades from cutting, or both.

The operator 108 typically wears the safety device 114 on a limb. FIG. 1 illustrates safety devices 114 worn around the each of the operator's wrists and safety devices 114 worn around each of the operator's lower legs. The safety device 114 can also be attached to the operator's gloves or boots.

In other embodiments, the safety device 114 can be located on any foreign body which could cause damage to the machinery if it was introduced into the working parts of the machine 102. For example, a metal pole used to push material into a cutting or grinding mechanism could damage the mechanism if it is inserted too far. By locating the safety device 114 on the working end of the pole, the control circuitry 112 would detect when the pole comes within a predetermined distance of the sensor array 110 and stop all or part of the machine operation.

In an embodiment, the safety device 114 comprises at least one magnet, which produces a magnet field. In another embodiment, the safety device comprises at least two magnets. The sensor elements 110a and 110b detect the magnetic field from the magnet of the safety device 114.

Figure 2:
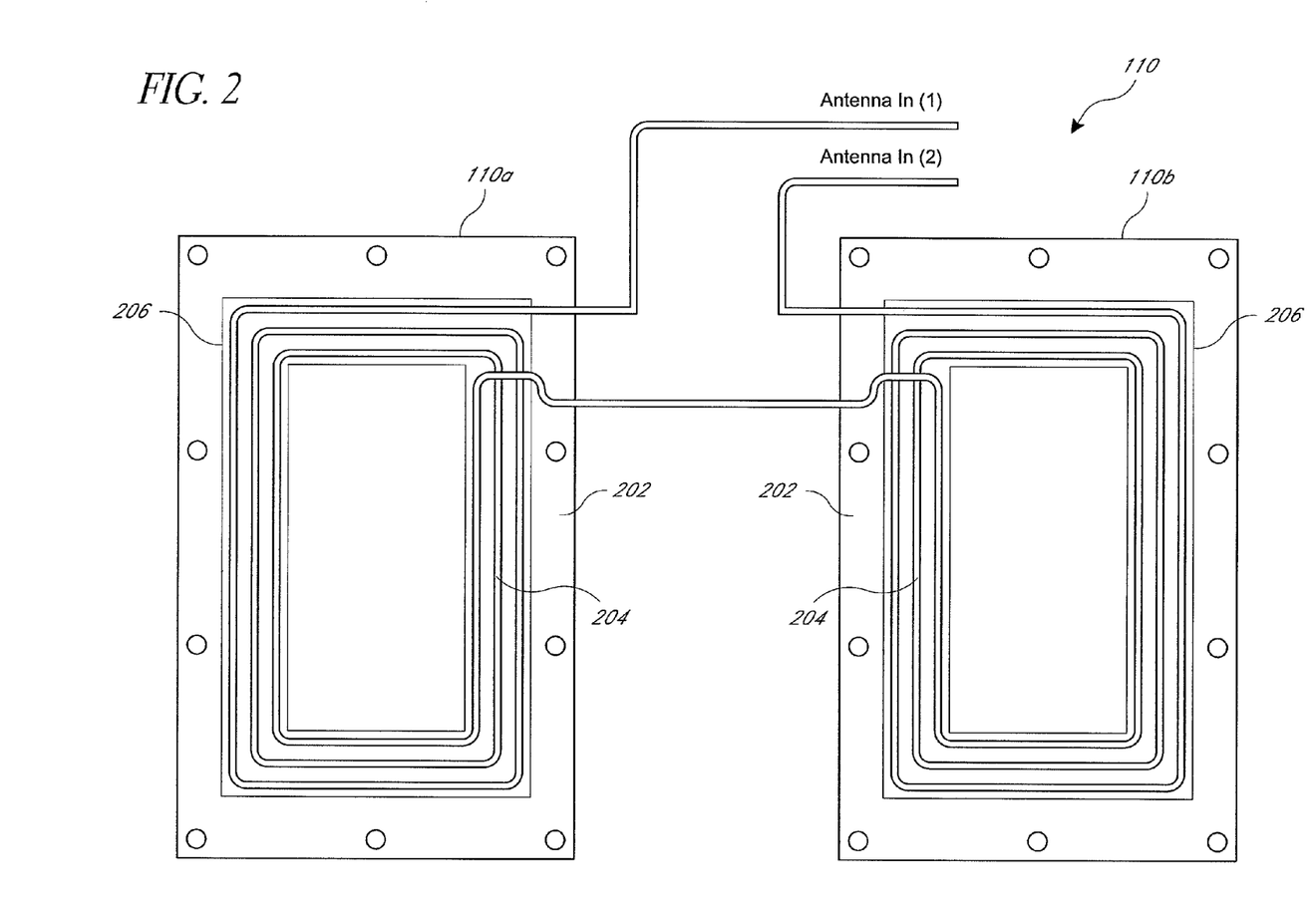
FIG. 2 illustrates an exemplary sensor array, according to certain embodiments.

FIG. 2 illustrates an exemplary sensor array 110 comprising the first sensor element 110a and the second sensor element 110b. Each sensor element or antenna 110a, 110b comprises a plate 202 and at least one winding or loop of wire 204. In other embodiments, the sensor array elements 110a, 110b comprise windings or loops 204 without the plate 202.

In an embodiment, the plate 202 is made of metal to withstand the extreme forces of pounding lumber and tree limbs as these materials are being loaded and pulled through the wood chipper 102. In an embodiment, the front side of the metal plate 202 comprises a beveled edge to reduce binding between the plate 202 and the material being fed into the chipper 102. For example, the bevel can be between approximately 20° and approximately 60°, and preferably around 40°. The backside of the plate, which is illustrated in FIG. 2, has a routed channel or groove 206 proximate to the edges, where the winding 204 lays. In embodiments where the machine 102 produces vibrations, the channels 206 are filled with a potting material, such as silicon glue, for example, to prevent the winding 204 from vibrating within the channel 206. In one embodiment, the plate 202 mounts to a sidewall of the wood chipper infeed chute 106 such that the winding 204 is captive between the plate face and the infeed chute sidewall to protect the winding 204 from the materials being loaded into the chipper 102.

In one embodiment, the plate 202 comprises an aluminum plate. As a non-ferrous material, aluminum advantageously does not attenuate the magnetic fields from the safety devices 114. Such attenuation would result in a loss of sensitivity in the detection of the safety devices 114. In other embodiments, the plate comprises other metals, such as steel, stainless steel, brass, copper, and the like, and non conductive materials, such as plastic, methyl methacrylate, polyoxybenzylmethylenglycolanhydride, plywood, wood, and the like.

In one embodiment, the metal plate 202 has a height of approximately 24½", a width of approximately 12½" and a thickness of approximately ½". In other embodiments, the height can be more or less than 24½", the width can be more or less than 12½" and the thickness can be more or less than ½". The metal plate can be square, rectangular, circular, oval, irregularly shaped, or the like.

The sensor array elements 110a, 110b further comprise the winding or antenna 204 wound in the groove 206 in the metal plate 202. The winding 204 comprises standard insulated conductive wire which can withstand the environmental conditions. The wire can be single or multiple conductor wire. The gauge of the wire can range from approximately 36 AWG to approximately 12 AWG. In another embodiment, the wire gauge number can be smaller than 12 AWG or larger than 36 AWG. In one embodiment, 18 AWG copper, type CL2 E60233-8, 7 conductor wire was used.

In an embodiment, each sensor array element 110a, 110b is wound with between approximately 3 turns and approximately 100 turns. In one embodiment, each sensor array element 110a, 110b is wound with approximately 14 turns. In other embodiments, the number of turns is greater than 100 or less than 3. Each wire used in the winding 204 has a start end and a finish end.

As illustrated in FIG. 2, each sensor array element 110a, 110b is wound in an opposite direction, such that when the sensor array elements 110a, 110b mount on opposing sides of the infeed chute 104, they are wound in the same direction with respect to each other. For example, the winding 204 of sensor array element 110a is wound clockwise and the winding 204 of sensor array element 110b is wound counterclockwise. In another example, the winding 204 of sensor array element 110a is wound counterclockwise and the winding 204 of sensor array element 110b is wound clockwise.

Further, as illustrated in FIG. 2, the sensor array elements 110a 110b are connected in series opposing, such that a start end of one of the windings 204 connects to a start end of the other of the windings 204 or a finish end of one of the windings 204 connects to a finish end of the other of the winding 204. For example, the start ends of each winding 204 connect together and the finish ends input to the control circuitry 112 as the ANTENNA IN signals. In another example, the finish ends of each winding 204 connect together and the start ends of each winding input to the control circuitry 112 as the ANTENNA IN signals. In one embodiment, the sensor array elements 110a, 110b connect in series opposing with the same number of turns, but wound in opposite directions, such that one sensor element 110a, 110b is wound counter clockwise and another sensor element 110a, 110b is wound counterclockwise and when the sensor elements 110a, 110b are mounted on opposing sides of the infeed chute 104, they are wound in the same direction with respect to each other.

A current is induced in a loop of conductive wire when a magnetic field is moved toward the loop. The amount of induced current is proportional to the number of loops in the winding 204. The amount of induced current is also proportional to the distance between the magnetic field and the loop. Here, as the magnetic field generated by the magnet of the safety device 114 moves closer to and between the elements 110a, 110b of the sensor array 110, a current/voltage potential is induced in each winding 204 of the sensor array 110. As the magnet moves closer to the sensor array 110, the induced current increases.

Induced currents/voltage potentials from external fields of magnetic flux are canceled by the sensor array 110. The Earth acts as a point source of magnetic radiation with respect to the array elements 110a, 110b. With respect to the sensor array 110, the Earth radiates equidistant magnetic flux lines through the center of each wind/loop 204. The Earth's magnetic flux induces a current in the windings/loops 204 when the sensor array elements 110a, 110b move. Since the chipper 102 can vibrate substantially during operation, a current/voltage potential will be induced in the array elements 110a, 110b due to the Earth's magnetic field. Because this is an external field to the safety system 100, the current induced in each winding 204 is of approximately equal strength and flows in the same direction in each winding 204. Since the windings 204 electrically connect in series opposing manner, the signals generated in each winding due to the Earth cancel. As such, the array elements 110a, 110b perform noise canceling for point sources of magnetic flux.

Other sources of magnetic flux, such as an engine firing, and the like, which are far from the array 110 when compared to distance between the safety device 114 and the array 110, will also act as point sources and the effect of any radiated magnet flux is canceled in the sensor elements 110a, 110b.

Induced currents/voltage potentials from internal fields of magnetic flux, such as those created by the safety device 114, are added together by the sensor array 110. As the safety device 114 passes between the array elements 110a, 110b, the same motion of the magnetic field at the same time to both array elements 110a, 110b induces current/voltage potential of approximately equal and opposite strength in each sensor array element 110a, 110b. Because of the series opposing connection of the sensor elements 110a, 110b, the effect of the moving magnetic field is additive. Thus, instead of the induced currents canceling as is the case with the Earth's magnetic field, the induced currents from the safety device 114 add together. In other words, the induced current/voltage potential due to the safety device 114 is the sum of the magnitude of the induced current/voltage potential in each array element 110a, 110b.

The control circuitry 112 amplifies and compares the differential signal to a threshold. In an embodiment, the threshold is predetermined. In another embodiment, the threshold is user settable. When the induced current/voltage potential exceeds the threshold, the control circuitry 112 generates control signals to stop the operation of the feed mechanism 106, the cutting blades, both, or any other machine function or mechanism.

Figure 3:
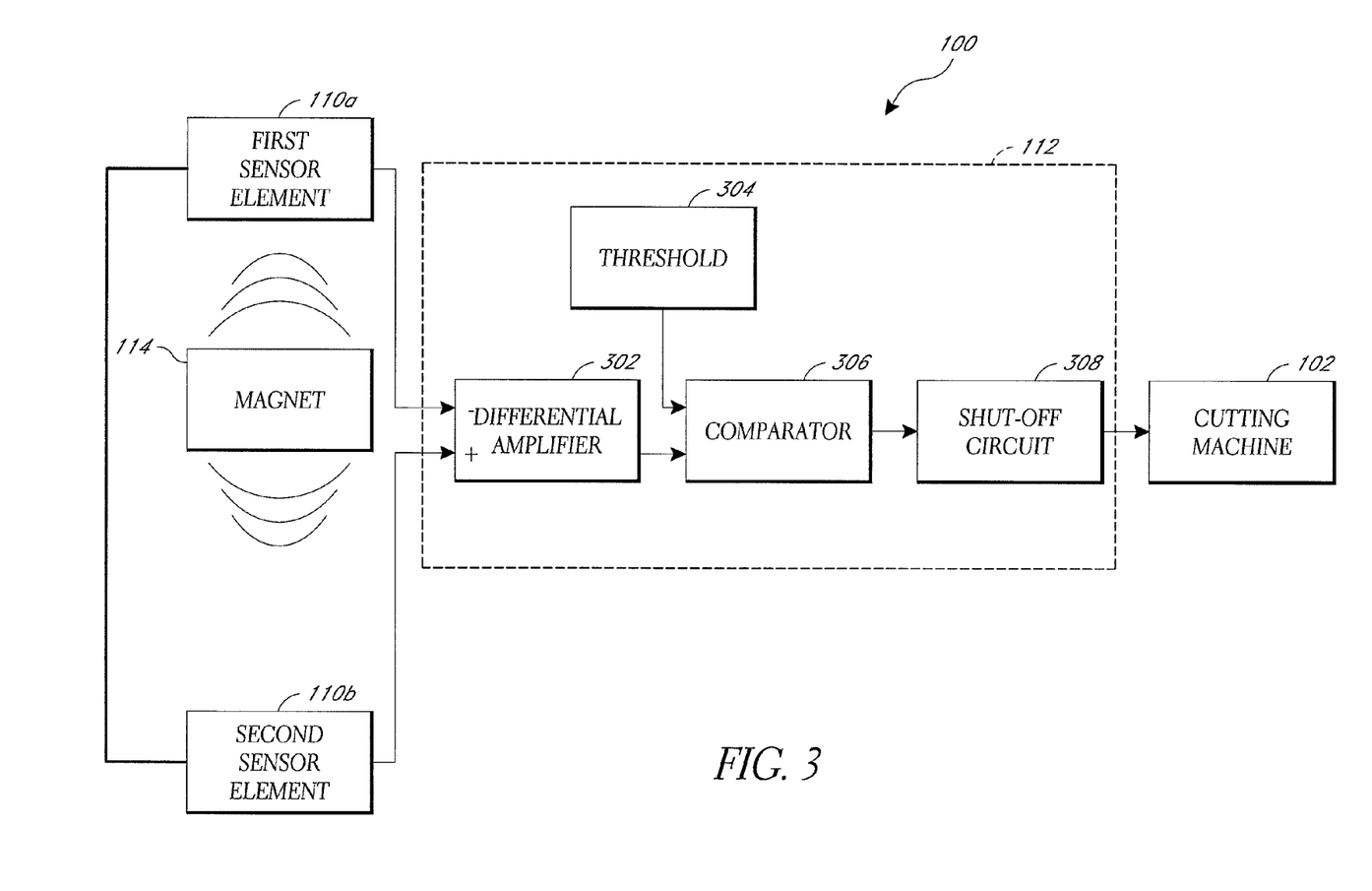
FIG. 3. illustrates a block diagram of an exemplary safety system to disable an operation of a cutting machine, according to certain embodiments.

FIG. 3 illustrates an exemplary block diagram of the safety system 100 for a cutting machine 102. The sensor array 110 detects the movement of the safety device 114 between the array elements 110a, 110b and sends a sensor signal to the signal processor 112. The sensor signal is based, at least in part, on the current induced in the sensor elements 110a, 110b, due to the movement of the magnetic field from the safety device 114 between the sensor array elements 110a, 110b. The signal is indirectly proportional to the distance between the safety device 114 and the sensor array 110. As the distance between the safety device 114 and the sensor array 110 decreases, the signal due to the induced current increases. As the distance between the safety device 114 and the sensor array 110 increases, the signal due to the magnetic field decreases proportional to the square of the distance.

The signal is also directly proportional to the number of loops in the winding 204 of the sensor array elements 110a, 110b. As the number of loops increase, the signal due to the magnetic field increases and as the number of loops decreases, the signal due to the magnetic field decreases.

The signal processor 112 comprises a differential amplifier 302, a threshold circuit 304, a comparator 306, and a shut-off circuit 308. The differential amplifier 302 receives the sensor signals ANTENNA IN(1), ANTENNA IN(2) from the sensor array 110. The sensor signals represents the magnitude of the signal in the series opposed sensor array elements 110a, 110b. The differential amplifier 302 amplifies the sensor signal.

The threshold circuit 304 outputs two equal and opposite threshold levels. Depending on how the windings 204 of the sensor elements 110(a), 110(b) connect to form the series opposing connection and or the makeup of the safety devices 114 with magnetic poles facing a direction and or the direction of motion of these safety devices 114 within the sensor elements 110(a), 110(b) the amplified signal from the differential amplifier 302 may be either a positive or a negative value. The threshold levels are set to cause the safety system 100 to shut off the cutting machine 102 when the safety device 114 is between the array elements 110(a), 110(b). In another embodiment, the threshold levels are set to cause the safety system 100 to shut off the cutting machine 102 when the safety device 114 is within a predetermined distance of the sensor array 110. Factors that affect the signal reaching and or crossing the threshold level include the strength, size, and number of magnets associated with the safety device 114, the size and number of loops in the winding 204, the number of sensor elements 110a, 110b, and the like. In one embodiment, the threshold circuit 304 outputs a predefined threshold. In another embodiment, the threshold is user defined.

The comparator circuit 306 compares the threshold set points from the threshold circuit 304 to the amplified sensor signal from the differential amplifier 302. When the amplified sensor signal is greater than or equal to the positive threshold set point, or when the amplified sensor signal is less than or equal to the negative threshold set point, the comparator circuit 306 outputs a shut-off signal to the shut-off circuit 308. In another embodiment, when the amplified sensor signal is greater than the positive threshold set point, or the amplified sensor signal is less than the negative threshold set point, the comparator circuit 306 outputs a shut-off signal to the shut-off circuit 308. In a further embodiment, when the amplified difference signal is greater than the positive threshold set point or less than the negative threshold set point by a predetermined amount, the comparator circuit 306 outputs a shut-off signal to the shut-off circuit 308.

The shut-off circuit 308 receives the shut-off signal and generates a control signal to shut-off the cutting machine 102. The cutting machine 102 receives the control signal and stops the feed mechanism 106, the cutting blades, or both.

Figure 4:
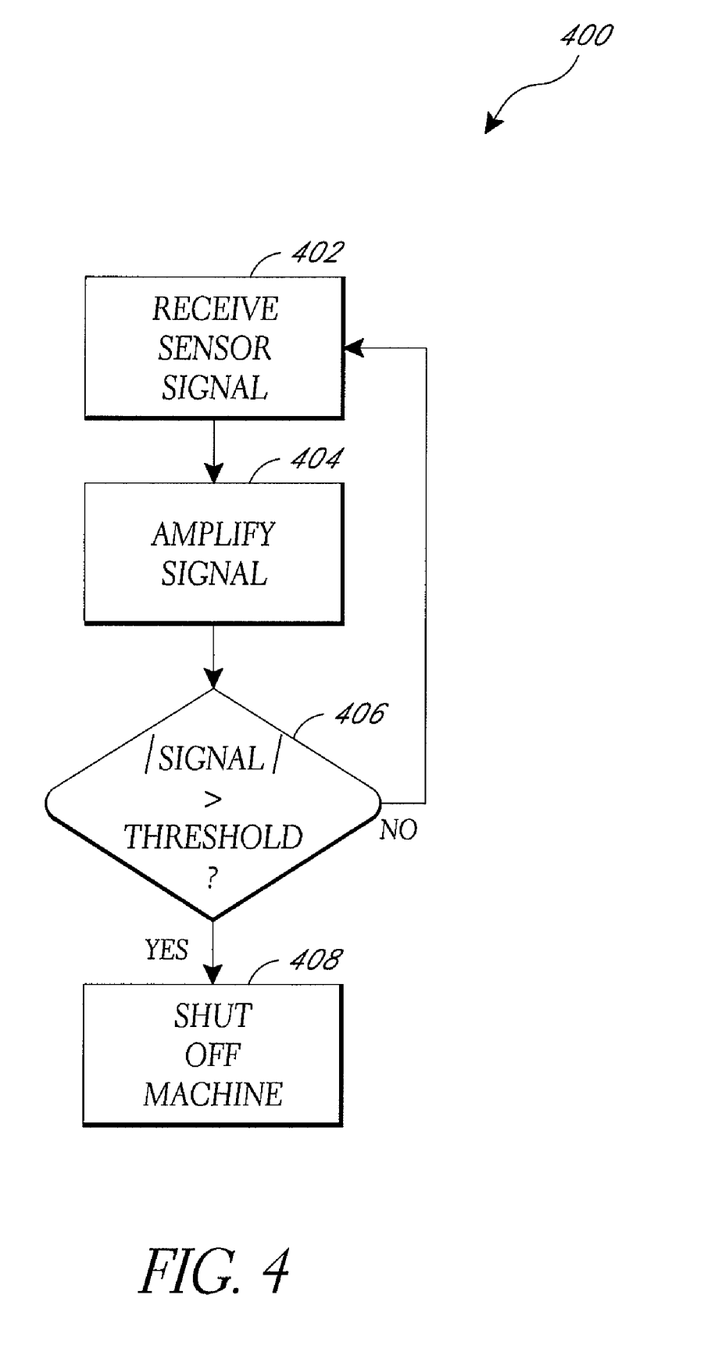
FIG. 4 illustrates a flowchart of an exemplary process for terminating an operation of a cutting machine, according to certain embodiments.

FIG. 4 illustrates a flowchart of an exemplary process 400 for the safety system 100. At block 402, the process 400 receives the sensor signal from the sensor array 110. The received sensor signal represents the sum of the current/voltage potential induced in each of the sensor array elements 110a, 110b. At block 404, the process 400 amplifies the received sensor signal.

At block 406, the amplified signal is compared to the two threshold set points. When the amplified signal is greater than the positive threshold, or less than the negative threshold, the process 400, at block 408, generates a shut-off signal to interrupt operation of the machine 102. In an embodiment, when the amplified signal is greater than the positive threshold or less than the negative threshold by a predetermined amount, the process 400 generates the shut-off signal to interrupt the operation of the machine 102. When the amplified signal is not greater than the positive threshold, greater than the positive threshold by a predetermined amount, less than the negative threshold, or less than the negative threshold by a predetermined amount, the process 400 returns to block 402.

Figure 5A:
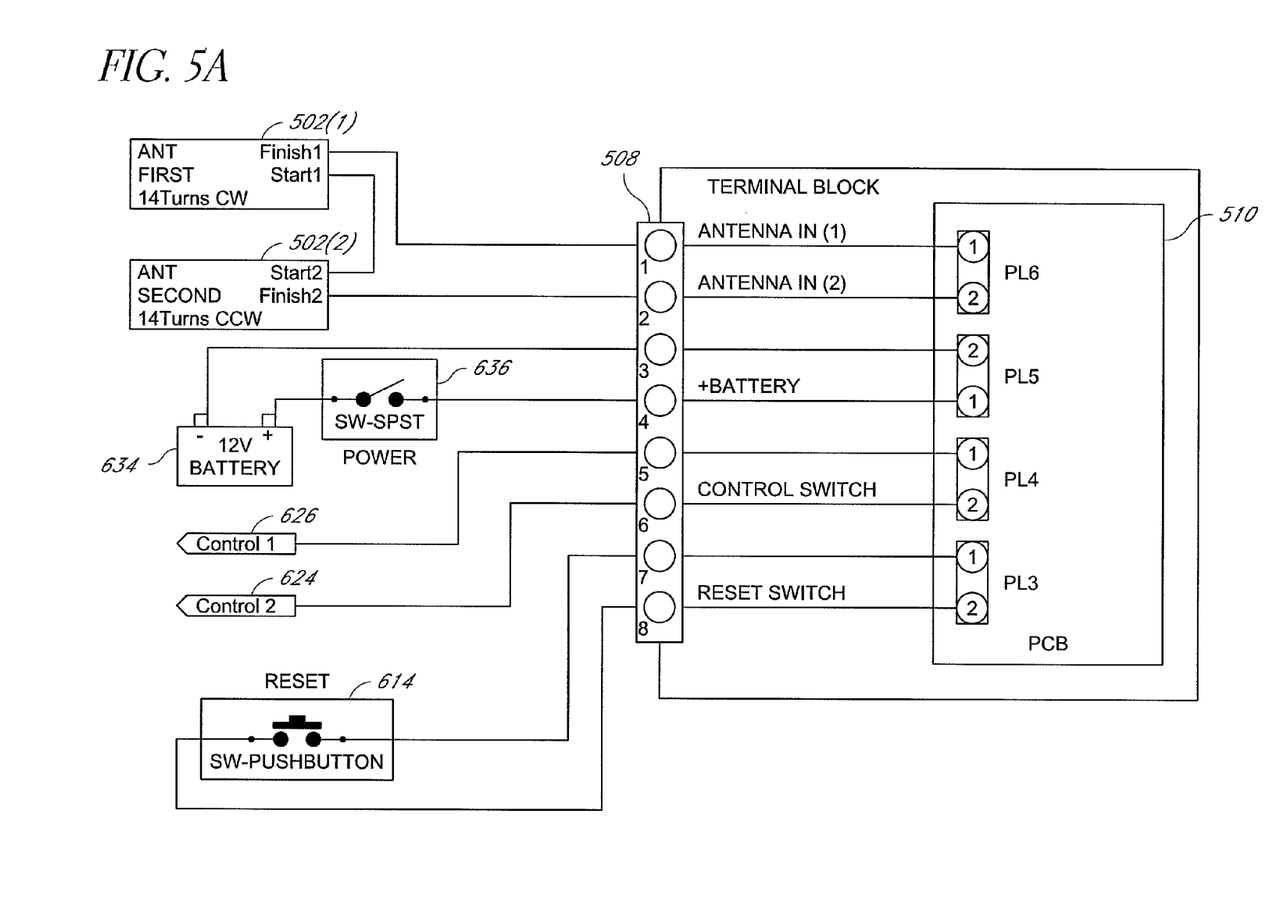
FIGS. 5A-5C illustrate an exemplary circuit for a cutting machine safety system, according to an embodiment.
Figure 5B:
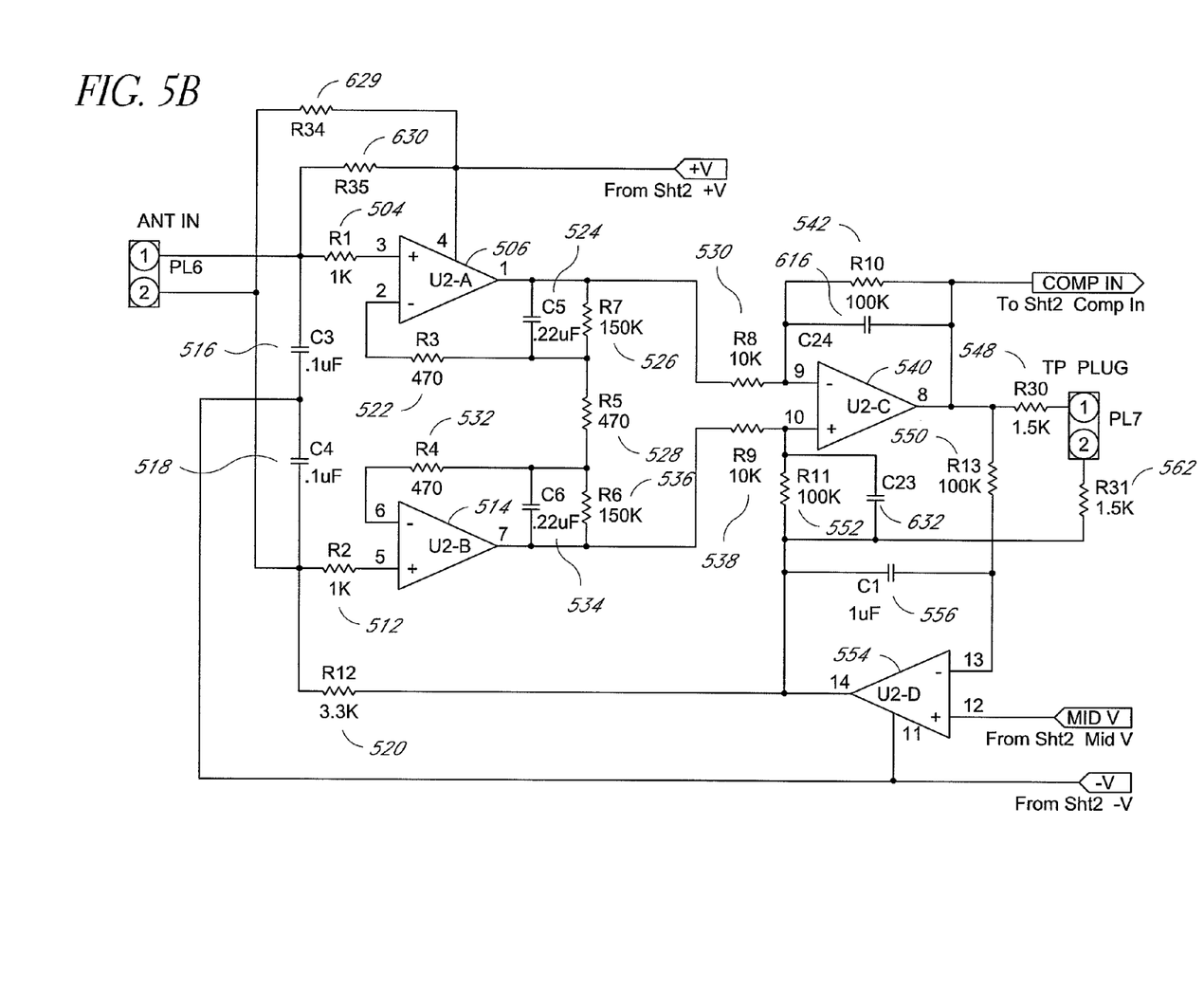
Figure 5C:
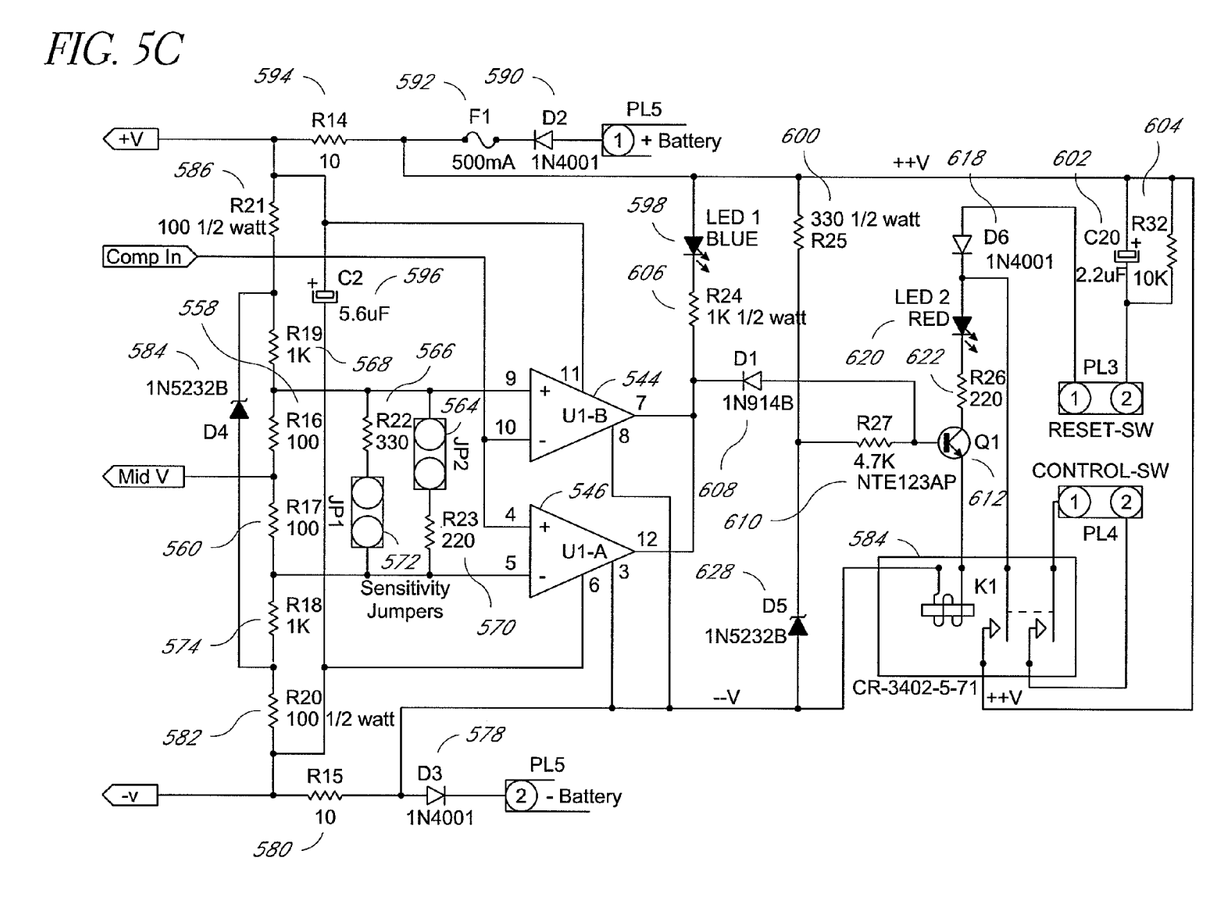

FIGS. 5A-5C illustrate an embodiment of the safety system 100 comprising the sensor array 110 and the signal processor 112. Referring to FIG. 5A, a sensor array 502 comprises a first sensor element 502(1) and a second sensor element 502(2). Preferably, the sensor elements 502(1), 502(2) mount on opposing sides of the infeed chute 104 of the machine 102.

The first sensor element 502(1) is wound with 14 turns of wire in a clockwise direction to form a first antenna or winding. The winding of the first sensor element 502(1) has a first end, Start1, and a second end, Finish1. The second sensor element 502(2) is wound with 14 turns of wire in a counterclockwise direction to form a second antenna or winding. The winding of the second sensor element 502(2) has a first end, Start2 and a second end, Finish2. The sensor elements 502(1), 502(2) connect in series opposing such that the first end of the first winding (Start1) connects to the first end of the second winding (Start2).

The second end of the first winding (Finish1), carrying the signal ANTENNA IN(1), connects to a first end of resistor R1 504, through terminal 1 of terminal block 508 and pin 1 of plug 6 on a printed circuit board (PCB) 510. The second end of the second winding (Finish2), carrying the signal ANTENNA IN(2) connects to a first end of resistor R2 512, through terminal 2 of terminal block 508 and pin 2 of plug 6 on the PCB 510.

A +12 volt battery 634 provides the voltage source. A positive terminal of the battery 634 couples to an anode of protection diode D2 590 through a POWER on/off switch 636, terminal 4 of terminal block 508, and pin 1 of plug 5 on PCB 510. A cathode of the protection diode D2 couples to a first end of a resistor R14 594 through a fuse F1 592. A second end of resistor R14 594 connects to a second end of R35 630.

A negative terminal of the battery 634 couples to a cathode of protection diode D3 578 through terminal 3 of terminal block 508 and pin 2 of plug 5 on PCB 510. An anode of the protection diode D3 578 connects to a first end of a resistor R15 580 and a second end of the resistor R15 580 connects to a second pin of C3 516 and a first pin of C4 518.

In an embodiment, battery 634 is a 12 volt battery. In other embodiments, other DC batteries, such as for example, 9 volts to 24 volts, and the like can be used. In yet other embodiments, an AC power supply with a rectifying circuit can be used to supply power to the signal processor 112.

In an embodiment, the POWER on/off switch 636 is a single pole single throw (SPST) normally open switch, or the like. In other embodiments, other switch configurations can be used as is known to one of ordinary skill in the art. In an embodiment, when the machine 102 is powered, the safety system 100 is also powered.

Referring to FIGS. 3 and 5B, the differential amplifier 302 comprises operational amplifiers U2-A 506, U2-B 514, and U2-C 540. Operational amplifier U2-A 506 pin 4 and operational amplifier U2-D 540 pin 11 connect to the positive power supply voltage and the negative power supply voltage, respectively, to provide power to operational amplifiers U2-A 506, U2-B 514, and U2-C 540, as is known to one of skill in the art. In the embodiment illustrated in FIG. 5B, operational amplifiers U2-A 506, U2-B 514, U2-C 540, along with circuit elements R1 504 through R11 552, and C3 516-C6 534, C23 632 and C24 616 amplify the antenna input signals ANTENNA IN(1) and ANTENNA IN(2) with a gain of approximately 6,400 and a roll off of approximately 5 Hz. Operational amplifier U2-D 554 along with a capacitor C1 556 and R13 550 comprise an auto-zeroing circuit to compensate for temperature drift.

Referring to FIG. 5B, a second end of resistor R2 512 connects to a positive input of the amplifier U2-B 514. The second end of resistor R1 504 connects to a positive input of the amplifier U2-A 506.

The first end of resistor R1 504 further connects to a first end of resistor R35 630 and a first pin of capacitor C3 516. A second pin of capacitor C3 516 connects to a first pin of capacitor C4 518 and the second end of resistor R15 580. A second end of resistor R35 630 connects to the second end of resistor R14 594.

A second pin of capacitor C4 518 connects to the first end of resistor R2 512, a first end of resistor R34 629, and a first end of resistor R12 520. A second end of resistor R34 629 connects to the second end of R35 630.

Resistors R34 629 and R35 630 compensate for the offset bias of the operational amplifiers U2-A 506 and U2-B 514, if needed, and are selectable.

A negative input of the amplifier U2-A 506 connects to a first end of resistor R3 522 and a second end of resistor R3 522 connects to a first pin of capacitor C5 524, a first end of resistor R7 526, and a first end of resistor R5 528. An output of the amplifier U2-A 506 connects to a second pin of capacitor C5 524, a second end of resistor R7 526, and a first end of resistor R8 530. In the illustrated embodiment, capacitor C5 524 and resistor R7 526 comprise approximately a 5 Hz filter.

A negative input of the amplifier U2-B 514 connects to a first end of resistor R4 532 and a second end of resistor R4 532 connects to a first pin of capacitor C6 534, a first end of resistor R6 536, and a second end of resistor R5 528. An output of the amplifier U2-B 514 connects to a second pin of capacitor C6 534, a second end of resistor R6 536, and a first end of resistor R9 538.

A negative input of the amplifier U2-C 540 connects to a second end of resistor R8 530, a first end of resistor R10 542, and a first pin of capacitor C24 616. An output of the amplifier U2-C 540 forms the signal COMP IN and connects to a second end of resistor R10 542, a second pin of capacitor C24 616, a first end of R30 548, and a first end of resistor R13 550.

A positive input of the amplifier U2-C 540 connects to a second end of resistor R9 538, a first end of resistor R11 552 and a first pin of capacitor C23 632. A second pin of capacitor C23 632 connects to a second end of resistor R11 552 and a first end of R31 562.

The response of amplifier U2-C 540 is based at least in part on the values of capacitors C23 632 and C24 616. In an embodiment, the values of capacitors C23 632 and C24 616 are each 0.33 μf to improve the roll of the filter.

Amplifier U2-D 554 is part of an auto-zero circuit to compensate for temperature drift for the differential amplifier 302. A positive input of the amplifier U2-D 554 connects to a reference voltage signal MID V, which is approximately ½ of the battery voltage, and is formed by a resistor divider coupled between the positive terminal and the negative terminal and comprises resistors R16 558-R21 586.

A negative input of the amplifier U2-D 554 connects to the second end of resistor R13 550 and a first pin of capacitor C1 556. An output of the amplifier U2-D 554 connects to a second end of resistor R12 520, a second pin of capacitor C1 556, the second pin of capacitor C23 632, and the second end of resistor R11 552.

In an embodiment, test points are provided. A first optional test point at pin 1 of plug 7 on the PCB 510 monitors the signal COMP IN and connects to a first end of resistor R30 548 and a second end of resistor R30 548 connects to the output of amplifier U2-C 540. A second optional test point at pin 2 of plug 7 monitors the auto zeroing circuit, which provides compensation for temperature drift. Pin 2 of plug 7 connects to a second end of resistor R31 562 and a first end of resistor R31 562 connects to the output of amplifier U2-D 554.

Referring to FIG. 4 Block 402 and FIG. 5B, amplifiers U2-A and U2-B receive the sensor signal. Referring to FIG. 4 block 404 and FIG. 5B, amplifiers U2-A, U2-B, and U2-C and their associated circuit components amplify the received sensor signal and output the amplified sensor signal to comparators U1-A 546, U1-B 544.

Referring to FIGS. 3 and 5C, the comparator 306 comprises comparators U1-A 546, U1-B 544, and the voltage divider comprising resistors R16 558-R21 586 and sensitivity jumpers JP1 572, JP2 564. The shut-off circuit 308 comprises transistor Q1 612 and relay K1 584. Comparator U1-A 546 pin 6 and comparator U1-B 544 pin 11 connect to the negative and positive power supply voltages respectively and comparator U1-A 546 pin 8 and comparator U1-B 546 pin 3 connect to the negative power supply voltage to provide power to comparators U1-A 546 and U1-B 544, as is known to one of skill in the art.

The output of amplifier U2-C 540 (COMP IN) connects to a negative input of the comparator U1-B 544 and a positive input of the comparator U1-A 546. A first sensitivity jumper JP1 572 in series with resistor R22 566 couples a positive input of comparator U1-B 544 to a negative input of comparator U1-A 546. In addition, a second sensitivity jumper JP2 564 in series with resistor R23 570 couples the positive input of comparator U1-B 544 to the negative input of comparator U1-A 546.

The positive input of comparator U1-B 544 further connects to a first end of resistor R16 558, and a first end of resistor R19 568. The negative input of comparator U1-A 546 further connects to a first end of resistor R17 560, and a first end of resistor R18 574.

Resistors R21 586, R19 568, R16 558, R17 560, R18 574, and R20 582 connect in series and couple between a second end of R14 594 and a second end of R15 580. The second ends of resistor R16 558 and resistor R17 560 connect and form the MID V signal, which is approximately one-half of the 12 volts, or approximately 6 volts. Capacitor C2 596 connects across the resistor divider to provide decoupling. An anode of zener diode D4 584 connects to the junction of resistors R18 574 and R20 582, while a cathode of zener diode D4 584 connects to the junction of resistors R21 586 and R19 568.

The value of the threshold is determined, at least in part, by the values of resistors R16-R23. Further, in an embodiment, sensitivity jumpers JP1 572 and JP2 564 can be optionally opened or closed to change the sensitivity of the signal processor 112. Sensitivity jumpers JP1 572 and JP2 564 adjust the sensitivity of the comparators U1-B 544, U1-A 546 by adjusting the threshold at which the comparators U1-B 544, U1-A 546 trip. This affects the distance between the sensor array 110 and the safety device 114 that causes at least one operation of the machine 102 to terminate.

In an embodiment illustrated in FIG. 5C, for comparative purposes, when both jumpers JP1 572, JP2 564 are closed, the system 100 is more sensitive than when jumper JP2 564 is closed and jumper JP1 572 is open. When jumper JP2 564 is closed and jumper JP1 572 is open, the system 100 is more sensitive than when jumper JP2 564 is open and jumper JP1 572 is closed. Finally, when jumper JP2 564 is open and jumper JP1 572 is closed, the system 100 is more sensitive than when both jumpers JP1 572, JP2 564 are open.

When the threshold 304 is lower or in other words, when the control circuitry 112 is more sensitive, the safety device 114 is farther from the sensor array 110 in order to cause the machine 102 to shut-off than when the threshold 304 is higher or the control circuitry is less sensitive. When the threshold 304 is higher, or in other words, when the control circuitry 112 is less sensitive, the safety device 114 is closer to the sensor array 114 in order to cause the machine 102 to shut-off than when the threshold is lower or the control circuitry is more sensitive.

In another embodiment, by adjusting the resistor values R16-R23, the sensitivity of the signal processor 112 can be adjusted. By selectively opening or closing the jumpers JP1, JP2, the sensitivity of the signal processor 112 can be finely tuned to the desired response.

An output of the first comparator U1-B 544 connects to an output of the second comparator U1-A, a first end of resistor R24 606, and a cathode of diode D1 608. A second end of resistor R24 606 connects to a cathode of an indicator diode LED1 598 and an anode of the indicator diode LED1 598 connects to first end of R14 594. In an embodiment, the indicator diode LED1 598 is a blue light emitting diode (LED), which, when turned on, indicates that the safety system 100 is tripped and the machine 102 is off. In other embodiments, other colors of LEDs can be used. In yet other embodiments, other indicia of activation, such as a beeper, and the like can be used. In further embodiments, there is no trip indicator.

An anode of diode D1 608 connects to a first end of resistor R27 610 and a base of transistor Q1 612. A second end of resistor R27 610 connects to a first end of resistor R25 600, and a cathode of zener diode D5 628. A second end of resistor R25 600 connects to the first end of R14 594 and an anode of zener diode D5 628 connects to the first end of R15 580.

An emitter of transistor Q1 612 connects to a first terminal of the coil of relay K1 584 and a second terminal of the coil connects to the first end of R15 580.

A first terminal of a first contact of the relay K1 584 couples to the cutting machine 102 through pin 1 of plug 4 on the PCB 510 and through terminal 5 of the terminal block 508, which carries a CONTROL 1 signal 626 to the cutting machine 102. A second terminal of the first contact of the relay K1 584 couples to the cutting machine 102 through pin 2 of plug 4 on the PCB 510 and through terminal 6 of the terminal block 508, which carries a CONTROL 2 signal 624 to the cutting machine 102.

A first terminal of the second pole of the relay K1 584 connects to an anode of an indicator diode LED2 620 and to a cathode of diode D6 618. A cathode of the indicator diode LED2 620 connects to a first end of resistor R26 622 and a second end of the resistor R26 622 connects to a collector of the transistor Q1 612. A second terminal of the second pole of the relay K1 584 connects to the first end of R14 594.

In one embodiment, the relay K1 584 is a 2 pole, single throw, normally open and momentary action relay, such as relay part number CR-3402-5-71. In other embodiments, other relays with different features, such as different numbers of pole and throws, normally closed, locking action, and the like can be used.

In an embodiment, indicator diode LED2 620 is a red LED. In other embodiments, other colors of LEDs can be used. In yet other embodiments, other indicia, such as a beeper, strobe lights, and the like can be used.

Referring to FIG. 4 Block 406 and 5C, when the amplified sensor signal is greater than the threshold, the relay K1 584 deactivates causing the poles to open, which disconnects the signals CONTROL 1 626 and CONTROL 2 624 from each other. In addition, indicator diode LED 2 turns off to indicate that the safety system 100 has terminated an operation of the machine 102.

Referring to FIG. 4 Block 408, the cutting machine 102 receives the signals CONTROL 1 626 and CONTROL 2 624 and shuts down. In an embodiment, the feed mechanism, the cutting blades, or both cease to operate. In an embodiment, the relay K1 584 provides the power to the infeed mechanism.

The use of the control signals CONTROL 1 626 and CONTROL 2 624 to shut off the machine 102 depends on the configuration of the specific machine. In other embodiments, there are other ways to use the CONTROL 1 and CONTROL 2 signals 626, 624 to terminate an operation of the machine 102, as is known to a person having ordinary skill in the art.

A first terminal of RESET switch 614 connects to an anode of diode D6 618 through terminal 7 of terminal block 508 and pin 1 of plug 3 on PCB 510. A second terminal of the RESET switch 614 connects to a first end of resistor R32 604 and a first pin of capacitor C20 602 through terminal 8 of terminal block 508 and pin 2 of plug 3 on PCB 510. A second end of resistor R32 604 and a second pin of capacitor C20 602 connect to the first end of R14 594.

Activating the RESET switch 614 resets the signal processor 112. The coil of relay K1 584 energizes and indicator diode LED 2 illuminates indicating that the safety system 100 is again active. In an embodiment, the RESET switch 614 is a pushbutton switch, or the like Table 1 indicates exemplary values the components of FIGS. 5A-5C, according to an embodiment. Unless otherwise indicated, resistors are ¼ W.

| R1  | 1 KΩ       |
|-----|------------|
| R2  | 1 KΩ       |
| R3  | 470 Ω      |
| R4  | 470 Ω      |
| R5  | 470 Ω      |
| R6  | 150 KΩ     |
| R7  | 150 KΩ     |
| R8  | 10 KΩ      |
| R9  | 10 KΩ      |
| R10 | 100 KΩ     |
| R11 | 100 KΩ     |
| R12 | 3.3 KΩ     |
| R13 | 100 KΩ     |
| R14 | 10 Ω       |
| R15 | 10 Ω       |
| R16 | 100 Ω      |
| R17 | 100 Ω      |
| R18 | 1 KΩ       |
| R19 | 1 KΩ       |
| R20 | 100 Ω ½ W  |
| R21 | 100 Ω ½ W  |
| R22 | 330 Ω      |
| R23 | 220 Ω      |
| R24 | 1 KΩ ½ W   |
| R25 | 330 Ω ½ W  |
| R26 | 220 Ω      |
| R27 | 4.7 KΩ     |

-continued

| | |
|---|---|
| R30 | 1.5 KΩ |
| R31 | 1.5 KΩ |
| R32 | 10 KΩ |
| R34 | Selectable for offset bias |
| R35 | Selectable for offset bias |
| Q1 | NTE123AP |
| U1 | LM319F |
| U2 | AD713JN |
| F1 | 500 ma |
| C1 | 1 µf |
| C2 | 5.6 µf |
| C3 | 0.1 µf |
| C4 | 0.1 µf |
| C5 | 0.22 µf |
| C6 | 0.22 µf |
| C20 | 2.2 µf |
| C23 | Selectable for best response |
| C24 | Selectable for best response |
| D1 | 1N914B |
| D2 | 1N4001 |
| D3 | 1N4001 |
| D4 | 1N5232B |
| D5 | 1N5232B |
| D6 | 1N4001 |
| LED1 | Blue 276-006 |
| LED2 | Red 276-086 |
| K1 | CR-3402-5-71 |

Figures 6, 7, 8:
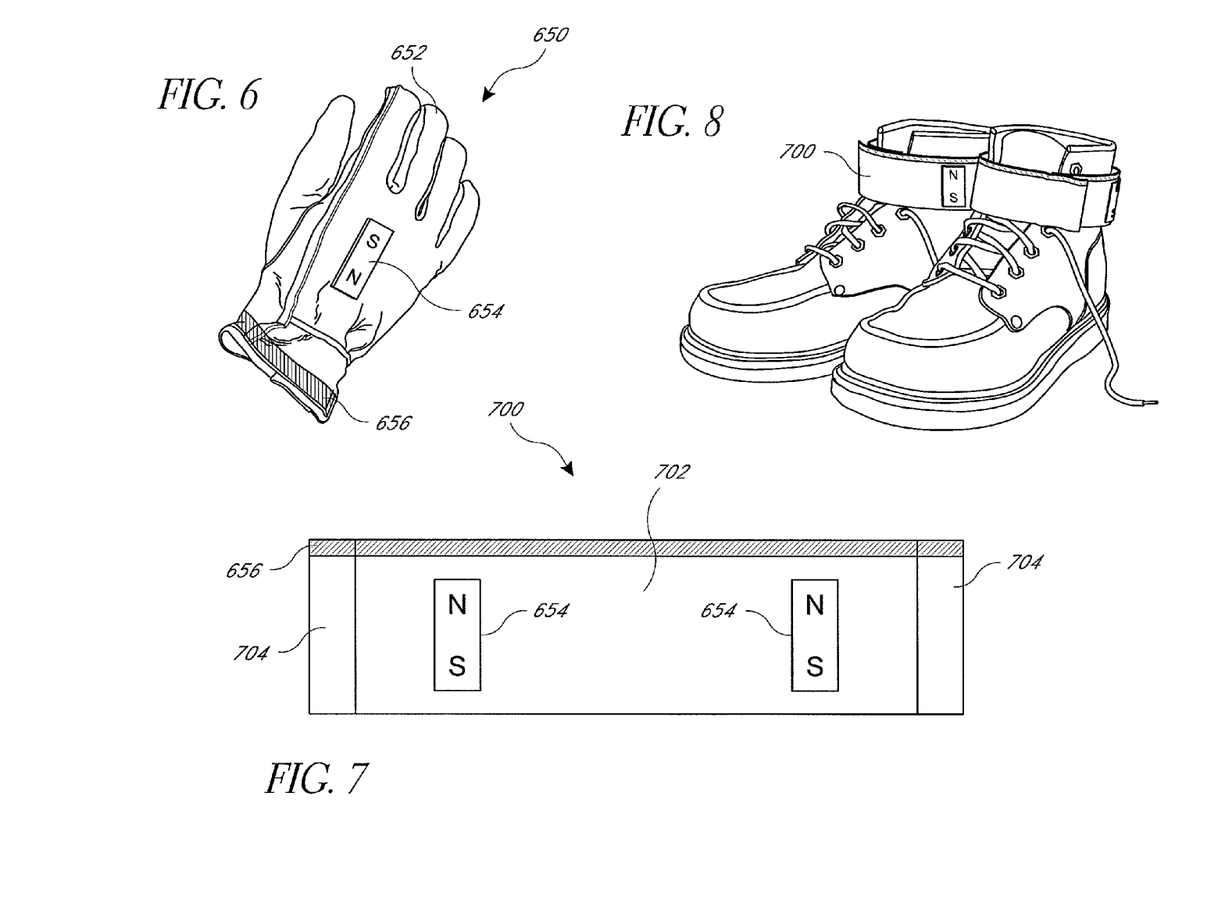
FIG. 6 illustrates an exemplary glove-type safety device, according to certain embodiments.
FIG. 7 illustrates an exemplary safety device worn on the user's limb, according to an embodiment.
FIG. 8 illustrates exemplary ankle bracelet safety devices worn around the user's shoes, according to an embodiment.

FIG. 6 illustrates an exemplary glove-type safety device 650. In an embodiment, the safety device 650 comprises a glove 652, such as a work glove, a magnet 654, and an indicator 656.

In some instances, chipping machine operators 108 may not wear gloves, as gloves have a possibility of catching on the branches and other materials being fed into the infeed chute 104. FIG. 7 illustrates an exemplary wrist-band/ankle bracelet safety device 700 that can be worn on the operator's limbs, such as around the wrist, ankle, or the like. FIG. 8 illustrates the safety device 700 worn on each shoe of a pair of shoes, such that each safety device 700 is around each of the operator's ankles. In other embodiments, the safety device 650, 700 comprises an article, a member, an apparatus, or an item that permits the magnet 654 to be removably attached to an operator's limb. In other embodiments, the safety device 650, 700 comprises an article, a member, an apparatus, or an item that is used to fasten the magnet 654 to a foreign body which could cause damage to the machinery if it was introduced into the working parts of the machine 102.

The safety device 700 comprises a band 702, a fastening mechanism 704, at least one magnet 654, and the indicator 656. The safety device 700 can comprise more or less than two magnets 654.

The magnet 654 can be any material or object that produces a magnet field, such as permanent magnets, magnetizable materials, electromagnets, pulsating electromagnets, ferromagnetic materials, ferrimagnetic materials, and the like. Examples of permanent magnet materials are alnico, ferrite, neodymium, and the like and examples of magnetizable materials are iron, nickel, cobalt, lodestone, and the like.

The magnet 654 can be any size or shape, such as a bar magnet, a circular magnet, a ring magnet, a cylindrical magnet, and the like. A magnet typically has a north pole and a south pole. In general, the farther apart the poles are on the magnet 654, the greater the induced current/induced voltage. Thus, when the poles on the magnet 654 are farther apart, the safety system 100 has greater sensitivity.

The surface field of the magnet 654 can range between approximately 4,000 gauss and approximately 10,000 gauss, and more preferably around approximately 6,000 gauss.

In an embodiment, the magnet 654 is a ½"×¼"×2" neodymium, grade N42, bar magnet.

For the better sensitivity, the magnets 654 located on the safety devices 650, 700 have the same alignment. In an embodiment where the safety device 650, 700 comprises more than one magnet 654, each magnet 654 on the safety device 650, 700 has the same alignment. In another embodiment where the operator 108 is wearing more than one safety device 650, 700, the magnets 654 in all of the worn safety devices 650, 700 have the same alignment. In other words, the same pole of the magnet 654 should be passing the sensor elements 110a, 110b regardless of whether the safety device 650, 700 is worn on the operator's hand, wrist, arm or foot, ankle, leg. For example, as illustrated in FIGS. 6 and 8, when the operator is wearing safety device 650 on his hand and safety device 700 on each of his shoes, the same pole of the magnet 654 on each safety device 650, 700, which is the south pole in this example, will pass through the sensor array 110 first when the operator 108 moves his hand or either foot into the infeed chute 104.

In another embodiment, the north pole of the magnet 654 is positioned on both of the safety devices 650, 700 closer to the operator's fingers and toes. In other embodiments, the poles of the magnets 654 on the safety devices 650, 700 are not aligned.

The indicator 656 is located on the safety device 650, 700 to indicate that the machine operator 108 is wearing the safety device 650, 700. In an embodiment, the indicator 656 is a band or stripe around the wrist portion of the glove 652. In another embodiment, the indicator 656 is a stripe along an edge of the band 702. In other embodiments, the indicator 656 is any material or emblem attached to the safety device 650, 700 that provides a visual indication that the operator 108 is wearing the safety device 650, 700. Further, the indicator 656 indicates that the operator is wearing the safety device 700 in the correct orientation for maximum effectiveness. For example, if the band indicator 656 of the safety device 700 worn on the operator's shoe is on the top edge and if the band indicator 656 of another safety device 700 worn on the operator's other shoe is on the bottom edge, then the magnets 654 in the two safety devices 700 are not aligned. This reduces the sensitivity of the safety system 100.

In an embodiment, the indicator 656 is brightly colored, such as neon green, fluorescent orange, bright blue, or the like, to allow easy identification of the safety device 650, 700 from a distance.

In an embodiment, the band 702 comprises fabric. Other examples of materials that can be used for the band 702 are plastic, paper, leather, or the like. When the operator 108 is wearing the safety device 700, the fastening mechanism 704 connects a first end of the band 702 to a second end of the band 702 such that the safety device 700, when worn, surrounds the operator's limb. Examples of the fastening mechanism 704 are hook and loop tape, straps, tape, ties, clips, and the like. In another embodiment, the band 704 is a continuous loop of elastic material such that the operator slips the elastic safety device over his hand/foot and onto his wrist/ankle. In an embodiment, the fastening mechanism 704 is configured to easily open in the event the safety device 114 becomes entangled in the branches being fed into the infeed chute 104.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of automatically interrupting the operation of a cutting machine, the method comprising:
    forming a sensor array including a first sensor element and a second sensor element, the first sensor element including a first conductive winding, the first conductive winding wound in a first direction, the second sensor element including a second conductive winding, the second conductive winding wound in a second direction, the first and second conductive windings connected in series opposing;
    mounting the sensor array on opposing sides of an infeed chute of a cutting machine such that the first sensor element is mounted to a first side of the infeed chute and the second sensor element is mounted to an opposing second side of the infeed chute;
    moving a magnetic safety device having a magnetic field, proximate to the sensor array;
    sensing a current induced in the first and second conductive windings by the magnetic field of the magnetic safety device, the current produced by the magnetic field of the magnetic safety device when the magnetic safety device moves proximate to the sensor array;
    comparing a signal proportional to the induced current to a threshold; and
    terminating an operation of the cutting machine when the signal exceeds the threshold.

2. The method of claim 1, wherein sensing a current induced in the first and second conductive windings comprises:
    inducing a first current in the first conductive winding from the magnetic safety device positioned between the first and second conductive windings;
    inducing a second current in the second conductive winding from the magnetic safety device positioned between the first and second conductive windings;
    adding the first and second induced currents;
    inducing a third current in the first conductive winding from an external source;
    inducing a fourth current in the second conductive winding from the external source; and
    subtracting the third current and the fourth current.

3. The method of claim 1, wherein the first and second directions are clockwise and counterclockwise.

4. The method of claim 1, wherein the conductive windings each include a first end and a second end and the first ends of the conductive windings are connected together.

5. The method of claim 1, wherein the first conductive winding and the second conductive winding each comprise between approximately 12 and approximately 16 turns.

6. The method of claim 1, wherein the magnetic safety device is worn by an operator on at least one of the operator's limbs.

7. The method of claim 1, wherein the signal is proportional to a sum of the current induced in the first conductive winding and the current induced in the second conductive winding.

8. The method of claim 1 further comprising restarting the operation of the cutting machine in response to pressing a reset switch mounted externally to the infeed chute of the cutting machine.

* * * * *